United States Patent
Deloy

(10) Patent No.: US 9,441,802 B1
(45) Date of Patent: Sep. 13, 2016

(54) DUAL MODE BACKLIGHT SYSTEM AND RELATED METHOD

(75) Inventor: Christian T. Deloy, Marion, IA (US)

(73) Assignee: Rockwell Collins, Inc., Cedar Rapids, IA (US)

(*) Notice: Subject to any disclaimer, the term of this patent is extended or adjusted under 35 U.S.C. 154(b) by 610 days.

(21) Appl. No.: 13/489,575

(22) Filed: Jun. 6, 2012

(51) Int. Cl.
  *F21S 13/14* (2006.01)
  *H05B 33/08* (2006.01)

(52) U.S. Cl.
  CPC ............ F21S 13/14 (2013.01); H05B 33/0845 (2013.01)

(58) Field of Classification Search
  CPC ............... F21Y 2101/02; F21Y 2113/005; F21Y 2103/003; F21Y 2105/001; F21Y 2113/00; H01L 25/0753; H01L 31/02021; G02F 1/133603; G02F 1/133605; G02F 1/133615; G02F 1/133308;
  (Continued)

(56) References Cited

U.S. PATENT DOCUMENTS

| | | | | |
|---|---|---|---|---|
| 4,096,217 A | * | 6/1978 | Roll | 264/20 |
| 6,844,824 B2 | * | 1/2005 | Vukosic | G08B 5/36 340/815.45 |
| 7,025,474 B2 | * | 4/2006 | Campbell | G02B 23/12 362/231 |
| 7,036,946 B1 | * | 5/2006 | Mosier | 362/27 |
| 7,058,252 B2 | * | 6/2006 | Woodgate | G02B 27/2214 348/E13.029 |
| 7,924,371 B1 | * | 4/2011 | Davis | 349/68 |
| 2005/0280785 A1 | * | 12/2005 | Beeson | H04N 9/3117 353/97 |

* cited by examiner

*Primary Examiner* — Stephen F Husar
*Assistant Examiner* — Danielle Allen
(74) *Attorney, Agent, or Firm* — Angel N. Gerdzhikov; Donna P. Suchy; Daniel M. Barbieri

(57) ABSTRACT

The present disclosure is directed to a dual mode backlight system and related method. The system may include a circuit card including a first array of lights for use in a day mode and a second array of lights for use in a night mode. The system may also include a heat sink which may be connected to the circuit card, and a light filter assembly. The light filter assembly may include a light filter plate and a plurality of light filters disposed within the light filter plate, where the light filters are configured for filtering light from the second array of lights. The system may also include a diffuse reflector connected to the light filter assembly, wherein the light filter assembly and diffuse reflector create an optical seal between the first array of lights and the second array of lights.

21 Claims, 4 Drawing Sheets

(58) Field of Classification Search
CPC .............. G02F 2001/133628; G02F 1/13362; G02F 2001/133317; G02F 1/1333; G02F 1/133385; G02F 1/1336; G02F 1/133608; G02F 1/133609; G02F 2001/133314; G02F 2001/133545; G02F 2001/133614; G02F 1/13318; G02F 1/133382; G02F 1/133512; G02F 1/133524; G02F 1/133606; G02F 1/133611; G02F 1/133621; G02F 1/1339; G02F 2001/133322; G02F 2001/133325; G02F 2001/133354; G02F 2001/133613; G02F 2001/133622; G02F 2001/133626; G02F 2201/36; G02F 2201/46; G02F 2201/50; G02F 2201/503; G02F 2201/58; G02F 2202/108; G02F 2203/055; G02F 2203/11; G02F 2203/60; G02B 6/0068; G02B 6/0073; G02B 27/286; G02B 6/0018; G02B 6/0028; G02B 6/0031; G02B 19/0066; G02B 27/1046; G02B 2027/0178; G02B 27/017; G02B 6/00; G02B 2027/0112; G02B 2027/014; G02B 27/0093; G02B 6/0085; G02B 6/0088; G02B 2027/0118; G02B 6/0036; G02B 6/0055; G02B 6/0076; G02B 2027/0138; G02B 27/0172; G02B 5/30; G02B 6/003; G02B 6/0056; G02B 6/0061; G02B 6/0091; G02B 27/0176; G02B 5/305; G02B 6/0021; G02B 6/0025; G02B 6/009; G02B 2027/0147; G02B 2027/0187; G02B 5/3083; G02B 6/0011; G02B 6/0016; G02B 6/0043; G02B 6/005; G02B 6/006; G02B 6/0075; G02B 6/0078; G02B 6/0083; G02B 6/0096; G02B 6/12019; G02B 19/0028; G02B 19/0061; G02B 2027/011; G02B 2027/012; G02B 2027/0123; G02B 2027/0127; G02B 2207/113; G02B 2207/115; G02B 27/0101; G02B 27/26; G02B 5/18; G02B 5/23; G02B 6/0013; G02B 6/0015; G02B 6/002; G02B 6/0023; G02B 6/0026; G02B 6/0041; G02B 6/0048; G02B 6/0053; G02B 6/0058; G02B 6/0065; G02B 6/0095; G02B 7/008; F21S 48/215; F21S 48/1154; F21S 48/2225; F21S 48/115; F21S 48/10; F21S 48/1159; F21S 48/1736; F21S 4/008; B60L 1/14; B60Q 1/2696; B63B 45/00; H05B 33/0857; H05B 33/0845; H05B 37/0218; H05B 37/0281; F21V 5/008; F21V 7/04; F21V 29/74; F21V 13/02; F21V 14/06; F21V 19/02; F21V 21/02; F21V 21/30; F21V 2200/20; F21V 23/005; F21V 23/0464; F21V 23/0471; F21V 23/0478; F21V 29/006; F21V 29/02; F21V 29/025; F21V 29/30; F21V 29/407; F21V 29/503; F21V 29/677; F21V 29/70; F21V 29/71; F21V 29/76; F21V 29/83; F21V 5/045; F21V 7/0091; F21W 2131/10; G06F 3/013; G06F 3/005; G06F 3/011; G06Q 30/02; B60K 2350/1024; B60K 2350/1028; B60K 35/00; B60R 11/0235; B60R 2001/1215; B60R 2011/0026; H02J 9/065; G08B 13/1481; G09G 3/3413; G09G 3/3426; G09G 2320/064; G09G 2320/0666; G09G 2330/045; G09G 3/006; G09G 3/2014; G09G 3/2018; G09G 3/3611; G09G 5/10; G09G 2300/0452; G09G 2320/0233; G09G 2320/0242; G09G 2320/0276; G09G 2320/0646; G09G 2340/06; G09G 2360/142; G09G 2360/145; G09G 2360/16; G09G 3/001; G09G 3/2003; G09G 3/3208; F21K 9/56; F21K 9/54; F21K 9/13; F21K 9/135; F21K 9/175; F21K 9/50; F21K 9/90
USPC .............. 257/E25.02, E25.028, E33.072, 88; 362/231, 545, 235, 293, 609, 800, 19, 362/230, 245, 612, 240, 243, 246, 257, 310, 362/311.02, 327, 544, 97.3, 249.02, 249.14, 362/555, 97.2; 349/62, 68; 353/31; 359/298, 634, 599, 13, 630; 345/102, 345/8, 690, 88, 158, 589; 340/525, 815.4

See application file for complete search history.

DUAL MODE BACKLIGHT SYSTEM AND RELATED METHOD

TECHNICAL FIELD

The present disclosure generally relates to the field of dual mode displays, and more particularly to a dual mode backlight system and related method.

BACKGROUND

High performance backlights with night vision compatibility for flat panel display applications are continually challenged to provide high levels of optical performance while maintaining compactness. Existing dual mode backlights may require multiple printed wiring boards, heatsink structures, a large number of Night Vision Imaging System (NVIS) filters, and complex light emitting diode (LED) packages, which results in increased costs and decreased ease of manufacturability.

In addition, existing direct view, dual mode backlights using single printed wiring boards may require absorptive polymeric NVIS filters and dissimilar day and night LED component packages. This approach may require the addition of blue LEDs and may also result in increased drive/feedback complexity for the system.

Therefore, there exists a need for improved methods and systems for backlighting a dual mode display.

SUMMARY

The present disclosure is directed to a dual mode backlight system and related method. The system may be used for backlighting a dual mode display. The system may include a circuit card including a first array of lights for use in a day mode and a second array of lights for use in a night mode. The system may also include a heat sink connected to the circuit card, and a light filter assembly. The light filter assembly may include a light filter plate and a plurality of light filters disposed within the light filter plate, where the light filters are configured for filtering light from the second array of lights. The system may also include a diffuse reflector connected to the light filter assembly, wherein the light filter assembly and diffuse reflector create an optical seal between the first array of lights and the second array of lights.

The present disclosure is also directed to a method for backlighting a dual mode display. The method may include the step of providing a circuit card with a first array of lights for use in a day mode and a second array of lights for use in a night mode. The next step requires adhering light filters to a light filter plate by applying adhesive to only a portion of the light filter plate or the light filters. The light filters are configured for filtering light from the second array of lights, and the light filter plate includes a first plurality of apertures and a second plurality of apertures. In a further step of the method, it is necessary to optically seal the first array of lights from the second array of lights by fastening a diffuse reflector to the circuit card and the light filter plate. In this method, light travels from the first array of lights through the first plurality of apertures in the light filter plate during the day mode and light travels from the second array of lights through the light filters and the second plurality of apertures in the light filter plate during the night mode.

In a further embodiment of the present disclosure, a dual mode backlight system is provided. The system may include a single circuit card which includes a first array of lights for use in a day mode and a second array of lights for use in a night mode. The system may also include a single heat sink connected to the circuit card as well as a light filter assembly. The light filter assembly includes a light filter plate and a plurality of light filters disposed within the light filter plate, each of said plurality of light filters configured for filtering light from the second array of lights. The light filter plate may also include a first plurality of apertures configured for enabling light from the first array of lights to pass through and a second plurality of apertures configured for enabling light from the second array of lights to pass through. The system may also include a diffuse reflector connected to the light filter assembly, wherein the light filter assembly and diffuse reflector create an optical seal between the first array of lights and the second array of lights.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The numerous advantages of the disclosure may be better understood by those skilled in the art by reference to the accompanying figures in which.

DETAILED DESCRIPTION

Reference will now be made in detail to the subject matter disclosed, which is illustrated in the accompanying drawings.

Figure 1:
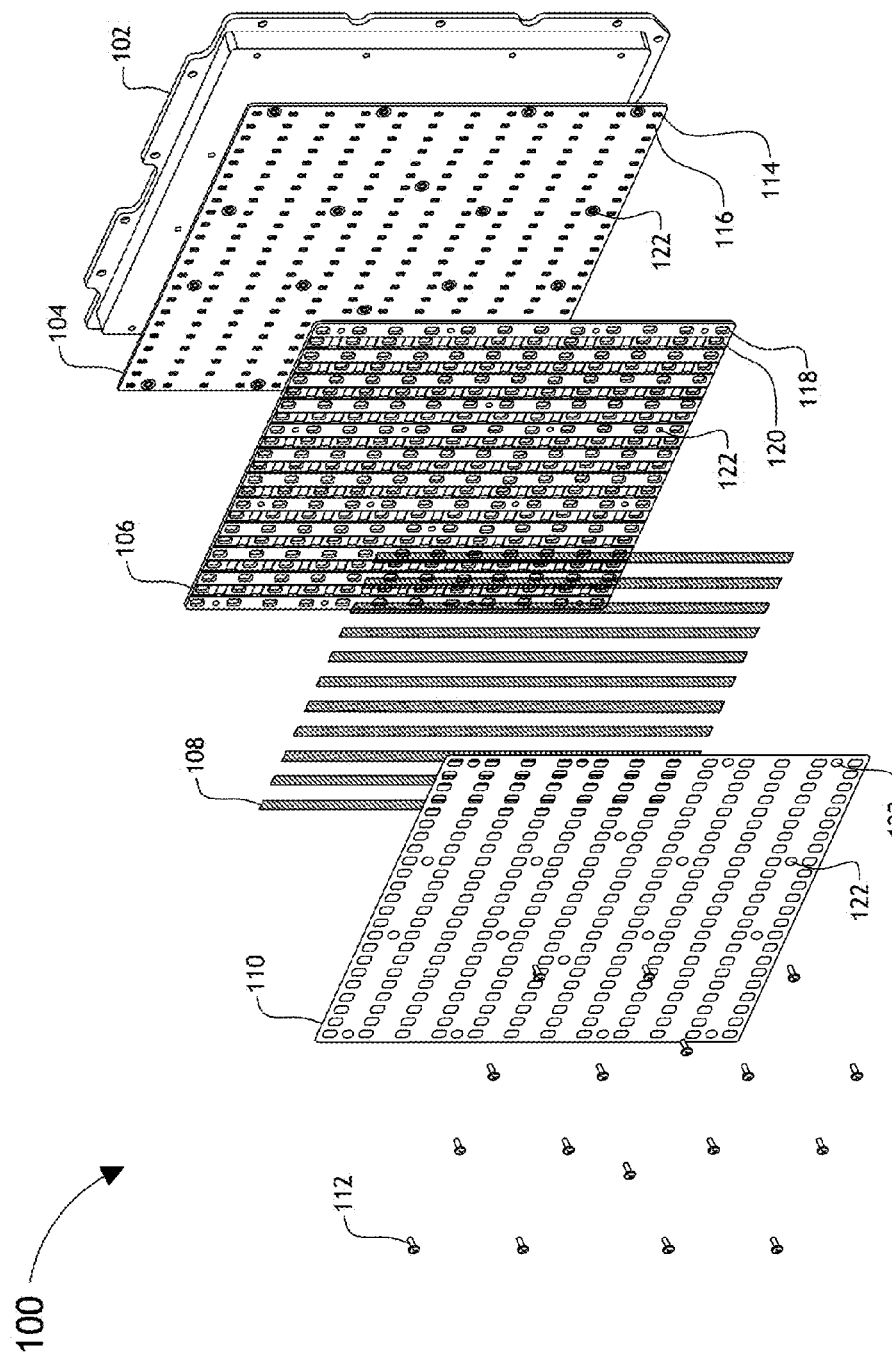
FIG. 1 is an exploded view of dual mode backlight system.

Referring generally to FIG. 1, a dual mode backlight system 100 is shown. The system 100 includes a heatsink 102, a circuit card 104, a light filter assembly including a light filter plate 106 and a plurality of light filters 108 disposed within the light filter plate 106, a diffuse reflector 110, and a plurality of fasteners 112. The circuit card 104 includes a first array of lights 114 for use in a first mode and a second array of lights 116 for use in a second mode. The light filter plate 106 may include a first plurality of apertures 118 configured for enabling light from the first array of lights 114 to pass through as well as a second plurality of apertures 120 configured for enabling light from the second array of lights 116 to pass through. The system 100 backlights a dual mode display by using the light filter assembly and diffuse reflector 110 to create an optical seal between the first array of lights 114 and the second array of lights 116 so that the system 100 may be used in either a first mode, which may be a day mode, or in a second mode, which may be a night mode.

The circuit card 104 shown in FIG. 1 of the dual mode backlight system 100 includes a first array of lights 114 for use in a first mode and a second array of lights 116 for use in a second mode. The circuit card 104 may be a printed wiring board with multiple layers with a thin layer of pressure sensitive adhesive laminated to one side. The circuit card 104 includes the first 114 and second 116 array of lights. In one embodiment, the first array of lights 114 is an array of light emitting diodes (LEDs) suitable for use in a day mode and the second array of lights 116 is an array of LEDs suitable for night use. The first array of lights 114 may include white LEDs, red LEDs, blue LEDs, or the like, and the second array of lights 116 may include the same type of LEDs or a different type. In one embodiment, the first array of lights and the second array of lights include white LEDs. The first array of lights and the second array of lights may be arranged on the circuit card 104 in alternating rows. In one embodiment, the circuit card includes a 12 by 12 array of day LEDs and an 11 by 12 array of night LEDs, dispersed in alternating rows on the circuit card 104. However, the population, configuration, arrangement, and density of the lights in the first array and second array may be adjusted depending on the characteristics and dimensions of the system 100.

The dual mode backlight system 100 may also include the heatsink 102 to facilitate conduction cooling of the first array of lights 114 and second array of lights 116, as shown in FIG. 1. The heatsink 102 may be connected to the circuit card 104 by applying a thin layer of pressure sensitive adhesive between the heatsink 102 and the circuit card 104. In one embodiment, the heat sink 102 is formed of AL 6061, but the heatsink 102 may be formed of any suitable material for dissipating heat or cooling an array of lights. The dual mode backlight system 100 may also include a plurality of fastener receiving holes 122 in the circuit card 104, light filter plate 106, and diffuse reflector 110. The fastener receiving holes 122 are configured for receiving each of the plurality of fasteners 112, and securing the circuit card 104, light filter plate 106, and diffuse reflector 110 into a single unit.

The dual mode backlight system 100 may be configured to maximize interchangeability of the system components with other backlighting systems, including single mode NVIS applications or displays that do not require NVIS compatibility. For example, if the system components are needed for a different system type, the same circuit card 104 and heatsink 102 may be used for multiple systems by removing the light filter assembly and installing a different type of diffuse reflector.

The dual mode backlight system 100 may also be configured to be compatible for use as a touchscreen display having a combined input and output device. In one example, the system 100 may include a user interface having a touchscreen for receiving input from a user.

The display of the dual mode backlight system 100 may include any type of electronic display. This may include a flat panel display suitable for use with night vision, a liquid crystal display (LCD) or other type of direct-view dual mode display.

In a further embodiment of the present disclosure as shown in FIG. 1, the dual mode backlight system 100 may include a single circuit card 104 which includes a first array of lights 114 for use in a day mode and a second array of lights 116 for use in a night mode. The system may also include a single heat sink 102 connected to the circuit card 104 as well as a light filter assembly. The light filter assembly includes a light filter plate 106 and a plurality of light filters 108 disposed within the light filter plate 106, each of said plurality of light filters 108 configured for filtering light from the second array of lights 116. The light filter plate 106 may also include a first plurality of apertures 118 configured for enabling light from the first array of lights 114 to pass through and a second plurality of apertures 120 configured for enabling light from the second array of lights 116 to pass through. The dual mode backlight system 100 may also include a diffuse reflector 110 connected to the light filter assembly, wherein the light filter assembly and diffuse reflector 110 create an optical seal between the first array of lights 114 and the second array of lights 116.

Figure 2:
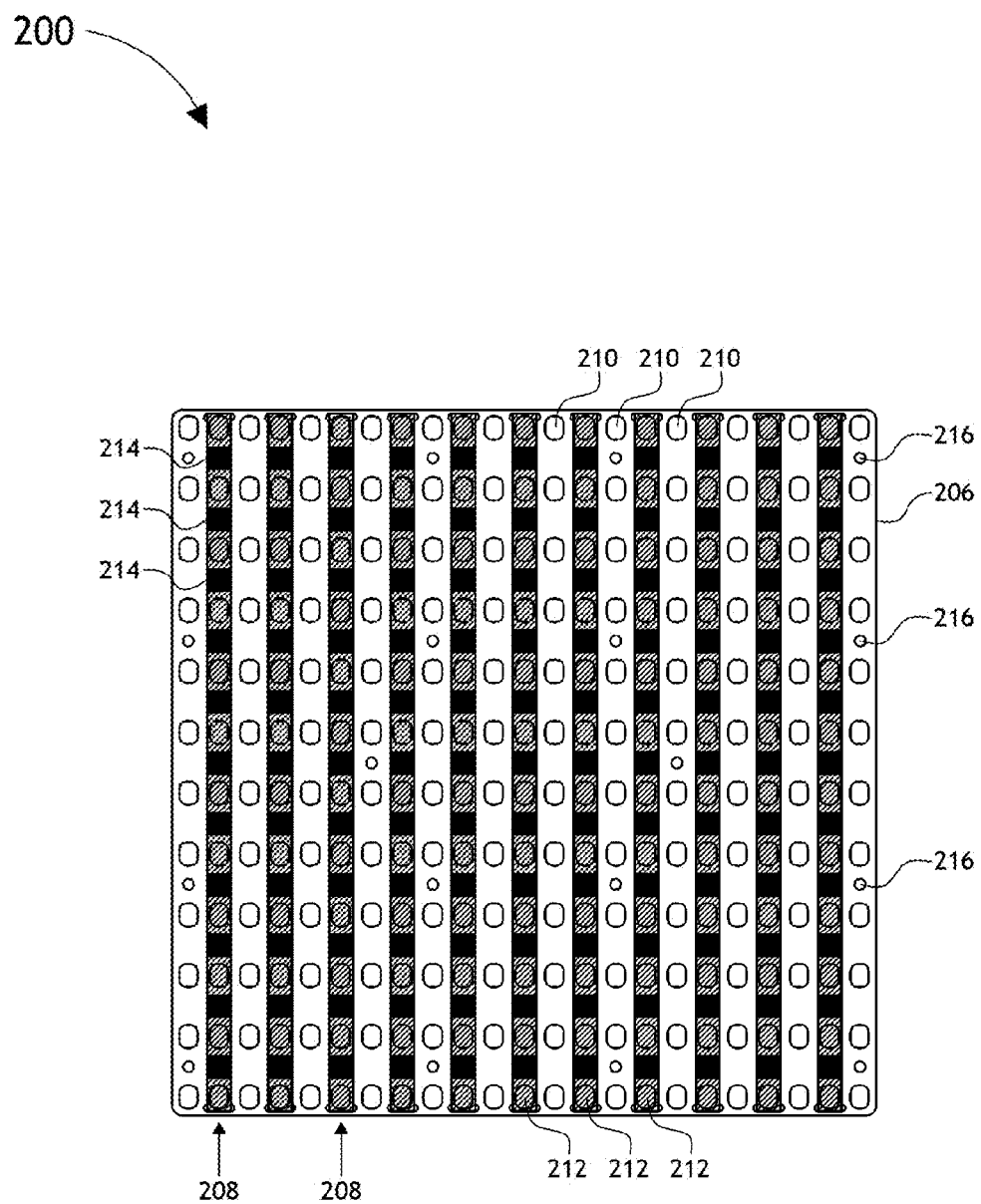
FIG. 2 is a light filter assembly detail view of the dual mode backlight system.

Referring to FIG. 2, a light filter assembly 200 of the dual mode backlight system is shown. The light filter assembly 200 includes a light filter plate 206 and a plurality of light filters 208 disposed within the light filter plate 206. The light filter assembly 200 may also include a plurality of adhesive locations 214 for securing each of the plurality of light filters 208 to the light filter plate 206. The light filter assembly 200 facilitates the creation of an optical seal between the first array of lights and the second array of lights of the dual mode backlight system, enabling use in both a day mode and a night mode.

As shown in FIG. 2, the light filter plate 206 of the light filter assembly 200 of the present disclosure is configured to provide the structure needed to locate and secure the light filters 208 and the diffuse reflector of the system. The light filter plate 206 also creates the physical partition between the first array of lights and the second array of lights on the single circuit card. The light filter plate 206 may include a first plurality of apertures 210 configured for enabling light from the first array of lights to pass through and a second plurality of apertures 212 configured for enabling light from the second array of lights to pass through. The first plurality of apertures 210 may be interleaved with the second plurality of apertures 212 to correspond to the placement of the first plurality of lights and the second plurality of lights on the circuit card. The light filter plate 206 may also include a plurality of fastener receiving holes 216 configured for receiving each of a plurality of fasteners for securing the light filter assembly 200 to the diffuse reflector and the heat sink. The light filter plate 206 may also include pocket locations configured for receiving the light filters 208. The pocket locations are configured to be set back from the plane of the light filter plate 206 at a depth that is roughly equal to the thickness of the light filters 208.

The light filters 208 of the light filter assembly 200 may be Night Vision Imaging System (NVIS) filters. The light filters 208 may be configured to effectively attenuate the near infrared wave-lengths of light required for NVIS operation. The light filters 208 may be shaped in the form of rectangular strips, as shown in FIG. 2. The light filters 208 are dimensioned in order to coordinate to the size and number of LEDs in the second array of lights and to fit into each of the pocket locations of the light filter plate 206.

The light filters 208 may be secured into the light filter plate via each of the plurality of adhesive locations 214. In one embodiment, an adhesive is applied to the pocket locations within the light filter plate 206 at the adhesive locations 214. Adhesive may also be applied on to the light filters 208 directly. Each adhesive location 214 of the plurality of adhesive locations 214 may be situated in between each aperture of the second plurality of apertures 212, as shown in FIG. 2. Continuous adhering around the periphery of each light filter 208 or across the entire surface of each light filter 208 is not required in order to achieve the optical seal between the first array of lights and the second array of lights. The application of the adhesive to the plurality of adhesive locations 214 is sufficient to secure the light filters 208 into the light filter plate 206 and achieve the optical seal once the diffuse reflector is installed onto the light filter assembly 200.

Figure 3:
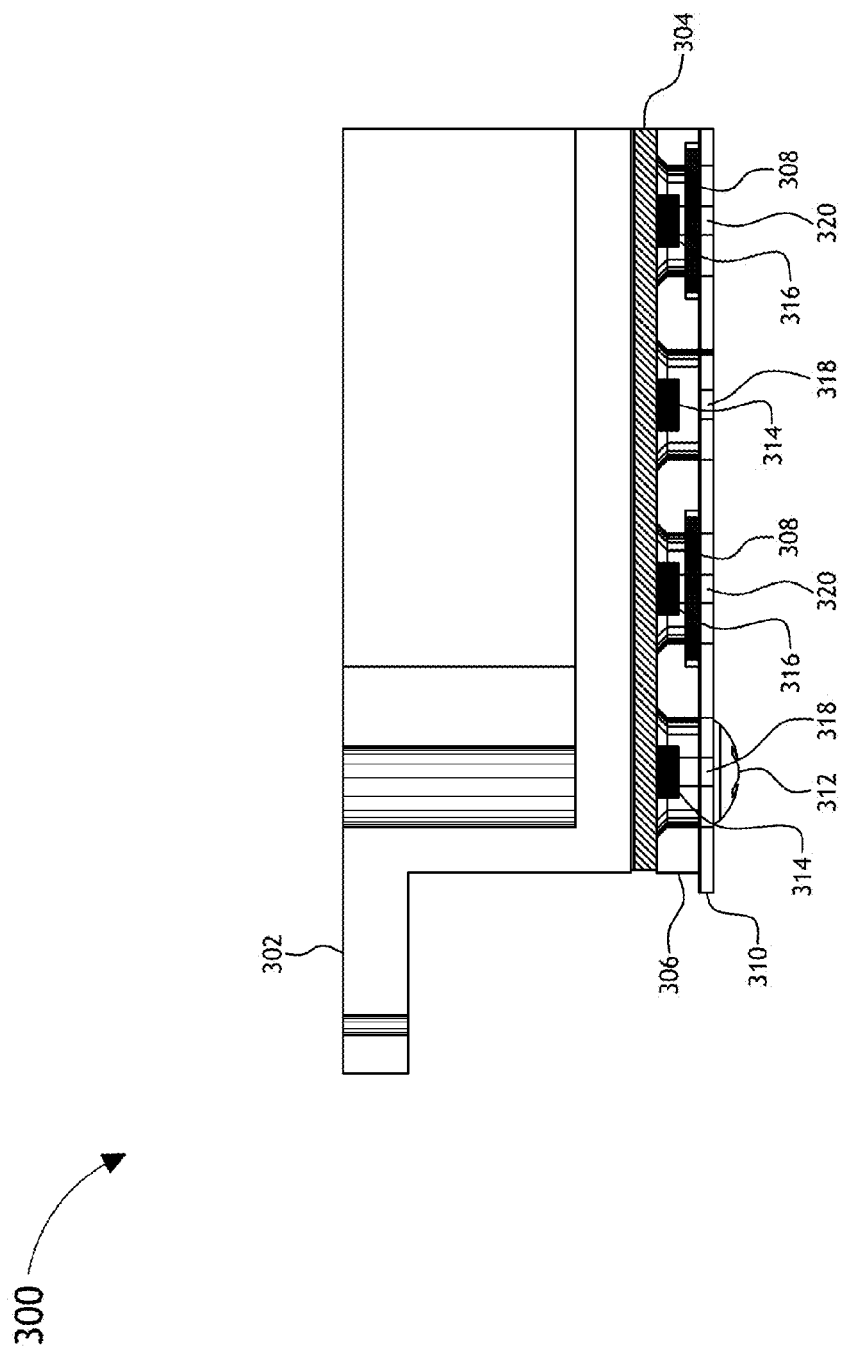
FIG. 3 is section view of a dual mode backlight system.

Referring to FIG. 3, a section view of the dual mode backlight system 300 is provided. The system 300 may function in both day time operation and night time operation. During day time operation, the first plurality of lights 314 is used to illuminate the display, while the second plurality of lights 316 may be on or off. The first plurality of lights 314 and the second plurality of lights 316 are located on the same circuit card 304, and may be interleaved across the surface of the circuit card 304. The circuit card 304 may include a first plurality of apertures 318 configured for allowing light from the first plurality of lights 314 to pass through, and a second plurality of apertures 320 configured for allowing light from the second plurality of lights 316 to pass through. The circuit card 304 may be connected to a heat sink 302 for cooling the first plurality of lights 314 and the second plurality of lights 316. A light filter plate 306 is connected to the circuit card 304 and provides a physical partition between the first array of lights and the second array of lights. The system 300 may also include a plurality of light filters 308 situated within the light filter plate 306, and a diffuse reflector 310. The diffuse reflector 310 is fastened to the light filter plate 306, circuit card 304, and heatsink 302 by a plurality of fasteners 312. During the day time operation, the light from the first plurality of lights 314 travels through each of the first plurality of apertures 318 and through the diffuse reflector 310.

During a night mode operation when NVIS is employed, the first plurality of lights 314 may be disabled and only the second plurality of lights 316 may be on. As shown in FIG. 3, the second plurality of lights 316 are situated to correspond to the plurality of light filters 308. The light filters 308 provide the requisite characteristics to be used in conjunction with an NVIS. The light from the second plurality of lights 314 passes through the second plurality of apertures 320 in the light filter plate 306 and then through the light filters 308 and the diffuse reflector 310. The heat generated by the first plurality of lights 314 and second plurality of lights 316 is dissipated through the heatsink 302.

Figure 4:
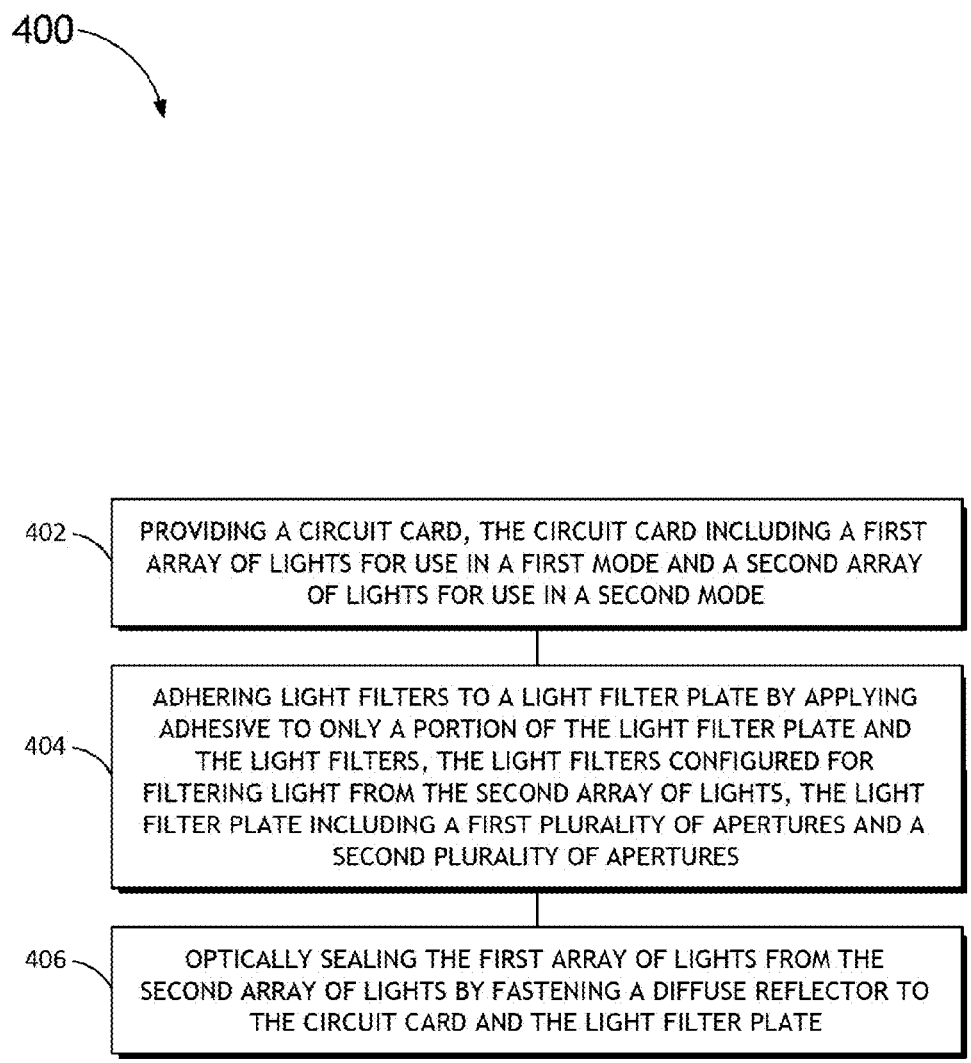
FIG. 4 is a flow diagram of a method for backlighting a dual mode display.

Referring now to FIG. 4, a method 400 for backlighting a dual mode display in accordance with the present disclosure is shown. The method 400 includes the step 402 of providing a circuit card, the circuit card including a first array of lights for use in a first mode and a second array of lights for use in a second mode. The next step 404 requires adhering light filters to a light filter plate by applying adhesive to only a portion of the light filter plate and the light filters. The light filters in this step 404 are configured for filtering light from the second array of lights, and the light filter plate in this step 404 includes a first plurality of apertures and a second plurality of apertures. A further step 406 in the method 400 requires optically sealing the first array of lights from the second array of lights by fastening a diffuse reflector to the circuit card and the light filter plate. In this method, light travels from the first array of lights through the first plurality of apertures in the light filter plate during the first mode and light travels from the second array of lights through the light filters and the second plurality of apertures in the light filter plate during the second mode. This enables the use of the display in either a day mode or a night mode.

In the present disclosure, the methods disclosed may be implemented as sets of instructions or software readable by a device. Further, it is understood that the specific order or hierarchy of steps in the methods disclosed are examples of exemplary approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

What is claimed is:

1. A dual mode backlight system, comprising:
   a circuit card having a first side and a second side, the circuit card including a first array of lights for use in a first mode and a second array of lights for use in a second mode, wherein the first array of lights and the second array of lights are arranged on the first side of the circuit card in alternating rows;
   a heat sink, the heat sink connected to the second side of the circuit card;
   a light filter assembly, the light filter assembly including a light filter plate and a plurality of light filters disposed within the light filter plate, each light filter of said plurality of light filters configured for filtering light from the second array of lights, the light filter plate connected to the first side of the circuit card to create a physical partition between the first array of lights and the second array of lights on the first side of the circuit card;
   a diffuse reflector, the diffuse reflector connected to the light filter assembly;
   wherein the light filter assembly and diffuse reflector are connected to the first side of the circuit card to create an optical seal between each light of the first array of lights and the second array of lights.

2. The system of claim 1, wherein the first array of lights is a plurality of day mode light emitting diodes.

3. The system of claim 1, wherein the second array of lights is a plurality of night mode light emitting diodes.

4. The system of claim 1, wherein the first mode is a day mode.

5. The system of claim 1, wherein the second mode is a night mode.

6. The system of claim 1, wherein the optical seal is created without light filters configured for filtering the first array of lights.

7. The system of claim 1, wherein the plurality of light filters are in the form of rectangular strips, and wherein the light filter plate includes pocket locations for receiving the light filters.

8. The system of claim 1, wherein the light filters are mounted to the light filter plate by applying adhesive to at least one of: the light filter and the light filter plate.

9. The system of claim 8, wherein the adhesive is applied to less than the entire surface of the at least one of the light filter or the light filter plate.

10. A method for backlighting a dual mode display, comprising the steps of:
    providing a circuit card with a first side and a second side, the circuit card including a first array of lights for use in a first mode and a second array of lights for use in a second mode, wherein the first array of lights and the second array of lights are arranged on the first side of the circuit card in alternating rows;

adhering light filters to a light filter plate by applying adhesive to only a portion of the light filter plate, a light filter of the light filters configured for filtering light from the second array of lights, the light filter plate including a first plurality of apertures and a second plurality of apertures;

optically sealing each light of the first array of lights from the second array of lights by fastening a diffuse reflector to the first side of the circuit card and the light filter plate;

wherein the light filter plate and the diffuse reflector are positioned to allow light to travel from the first array of lights through the first plurality of apertures in the light filter plate during the first mode and to allow light to travel only from the second array of lights through the light filters and the second plurality of apertures in the light filter plate during the second mode.

11. The method of claim 10, wherein the first array of lights is a plurality of day mode light emitting diodes.

12. The method of claim 10, wherein the second array of lights is a plurality of night mode light emitting diodes.

13. The method of claim 10, wherein the first mode is a day mode and the second mode is a night mode.

14. The method of claim 10, further comprising:
removing the light filter plate or removing the diffuse reflector to install a second diffuse reflector to change one or more optical attributes of the dual mode display.

15. The method of claim 10, wherein the light filter plate comprises pocket locations for receiving the light filters.

16. A dual mode backlight system, comprising:
a single circuit card with a first side and a second side, the circuit card including a first array of lights for use in a day mode and a second array of lights for use in a night mode, wherein the first array of lights and the second array of lights are arranged on the first side of the circuit card in alternating rows;
a single heat sink, the heat sink connected to the second side of the circuit card;
a light filter assembly, the light filter assembly including a light filter plate and a plurality of light filters disposed within the light filter plate, a light filter of said plurality of light filters configured for filtering light from the second array of lights, the light filter plate including a first plurality of apertures configured for enabling light from the first array of lights to pass through, the light filter plate further including a second plurality of apertures configured for enabling light from the second array of lights to pass through; and
a diffuse reflector, the diffuse reflector connected to the light filter assembly,
wherein the light filter assembly and the diffuse reflector are connected to the first side of the circuit card to create an optical seal between each light of the first array of lights and the second array of lights.

17. The system of claim 16, wherein the first array of lights is a plurality of day mode light emitting diodes.

18. The system of claim 16, wherein the second array of lights is a plurality of night mode light emitting diodes.

19. The system of claim 16, wherein the light filters are in the form of rectangular strips.

20. The system of claim 16, wherein the light filter plate includes pocket locations for receiving the light filters.

21. The system of claim 16, wherein the light filters are mounted within the light filter plate by applying adhesive to a portion of the light filter plate.

* * * * *